United States Patent
Moraes et al.

(10) Patent No.: US 10,120,697 B2
(45) Date of Patent: Nov. 6, 2018

(54) MOBILE DEVICE SUPPORT FOR SENSORS IN PERIPHERALS

(71) Applicant: Hewlett-Packard Development Company, L.P., Houston, TX (US)

(72) Inventors: Juliano Godinho Varaschin de Moraes, Mountain View, CA (US); Nicholas Hallas, Palo Alto, CA (US); John Michael Main, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 15/304,590

(22) PCT Filed: Apr. 24, 2014

(86) PCT No.: PCT/US2014/035346
§ 371 (c)(1),
(2) Date: Oct. 17, 2016

(87) PCT Pub. No.: WO2015/163894
PCT Pub. Date: Oct. 29, 2015

(65) Prior Publication Data
US 2017/0046173 A1 Feb. 16, 2017

(51) Int. Cl.
*G06F 3/00* (2006.01)
*G06F 9/4401* (2018.01)
(Continued)

(52) U.S. Cl.
CPC .......... *G06F 9/4411* (2013.01); *G06F 1/1632* (2013.01); *G06F 1/1684* (2013.01); *G06F 13/385* (2013.01)

(58) Field of Classification Search
CPC ...... G06F 13/385; G06F 9/4411; G06F 9/445; G06F 11/3485; G06F 11/3003; G06F 11/3051; G06F 11/3041; G06F 11/34
(Continued)

(56) References Cited

U.S. PATENT DOCUMENTS 8,467,779 B2  6/2013  Helfrich
2006/0223503 A1*  10/2006  Muhonen et al. ........ G06F 8/61
                                                        455/414.1
(Continued)

FOREIGN PATENT DOCUMENTS

IN   2010DE01677    7/2010
WO   WO-2012011121  1/2012

OTHER PUBLICATIONS

"Motion MEMS Smart Multi-axis Solutions for Enhanced User Experience," STMicroelectronics, May 2013, < http://www.st.com/web/en/resource/sales_and_marketing/promotional_material/brochure/brmems.pdf >.
(Continued)

*Primary Examiner* — Tim T Vo
*Assistant Examiner* — Kim T Huynh
(74) *Attorney, Agent, or Firm* — Brooks, Cameron & Huebsch PLLC

(57) ABSTRACT

Examples relate to extending hardware support for sensors embedded in peripherals. In some examples, a driver is used to determine that a peripheral device includes a sensor in response to the peripheral device being attached to a mobile computing device, where the driver is preloaded in an operating system kernel of the mobile computing device. Next, a list of supported hardware features is updated to include a peripheral hardware feature that is provided by a sensor of the peripheral device, and the list of supported hardware features is sent to an application store server. At
(Continued)

this stage, a list of available applications that are compatible with the list of supported hardware features is received from the application store server.

15 Claims, 3 Drawing Sheets

(51) Int. Cl.
    *G06F 13/38*     (2006.01)
    *G06F 1/16*     (2006.01)

(58) Field of Classification Search
    USPC .............................. 710/13–63, 100, 305–306
    See application file for complete search history.

(56) References Cited

U.S. PATENT DOCUMENTS

| | | |
|---|---|---|
| 2011/0161116 A1 | 6/2011 | Peak et al. |
| 2012/0017207 A1 | 1/2012 | Mahajan et al. |
| 2012/0264504 A1 | 10/2012 | Gagner et al. |
| 2013/0058659 A1* | 3/2013 | Umezu et al. ........ G06F 1/1632 398/128 |
| 2013/0159990 A1 | 6/2013 | Bohrer et al. |

OTHER PUBLICATIONS

Hofemeier, "Ultrabook™ and Tablet Windows* 8 Sensors Development Guide," Intel, Apr. 9, 2013, < http://softwareintel.com/en-us/articles/ultrabook-and-tablet-windows-8-sensors-development-guide >.

Ong, "Valarm Offers an Affordable Remote Sensor and Monitoring Solution for Android Devices," Mar. 30, 2013, < http://thenextweb.com/apps/2013/03/30/valarm-offers-an-affordable-remote-sensor-and-monitoring-solution-for-android-devices/#!qF244 >.

Brunette, "Open Data Kit Sensors: a Sensor Integration Framework for Android at the Application-level," Jun. 25-29, 2012, < htip://opendatakit.org/wp-content/uploads/2012/10/mobisys2012.pdf >.

* cited by examiner

MOBILE DEVICE SUPPORT FOR SENSORS IN PERIPHERALS

CROSS-REFERENCE TO RELATED APPLICATION

This application is a U.S. National Stage Application of and claims priority to International Patent Application No. PCT/US2014/035346, filed on Apr. 24, 2014, and entitled "MOBILE DEVICE SUPPORT FOR SENSORS IN PERIPHERALS," which is hereby incorporated by reference in its entirety.

BACKGROUND

Consumer mobile devices, such as smartphones and tablets, typically include a variety of sensors such as microphones, image sensors (i.e., cameras), global positioning system (GPS) sensors, accelerometers, etc. Because the sensors of a mobile device are generally static, drivers to support the various sensors are preinstalled in the operating system of the mobile device. Further, application stores provide applications to the mobile device based on the sensors that are known to be originally included in the mobile device.

BRIEF DESCRIPTION OF THE DRAWINGS

The following detailed description references the drawings, wherein.

DETAILED DESCRIPTION

As discussed above, consumer mobile devices typically have restricted access to application stores according to the hardware features included in the mobile devices. For example, a mobile device without a GPS sensor would be unable to execute and/or install an application that uses or claims to need a GPS. In this example, the hardware profiles of mobile devices in application stores are statically defined based on the devices' original specifications. However, peripheral devices that include sensors are increasingly being used with consumer mobile devices, which are unable to account for the sensors in their hardware profiles.

Example embodiments disclosed herein describe a method for extending the native hardware support for devices that run mobile operating systems. In response to peripheral devices with new sensors and hardware capabilities being attached to a mobile device, the hardware profile of the mobile device is dynamically extended to increase application compatibility. The extended hardware profile can then be used by an application store to provide previously incompatible applications to the mobile device For example, in some embodiments, a driver is used to determine that a peripheral device includes a sensor in response to the peripheral device being attached to a mobile computing device, where the driver is preloaded in an operating system kernel of the mobile computing device. Next, a list of supported hardware features is updated to include a peripheral hardware feature that is provided by a sensor of the peripheral device, and the list of supported hardware features is sent to an application store server. At this stage, a list of available applications that are compatible with the list of supported hardware features is received from the application store server.

In this manner, example embodiments disclosed herein allow for the hardware features of peripheral devices to be fully utilized by mobile computing devices. Specifically, preloaded drivers allow for a sensor in a peripheral device to be identified in response to being attached to the mobile computing device so that a list of supported hardware features of the device can be updated to include a hardware feature of the sensor.

Figure 1:
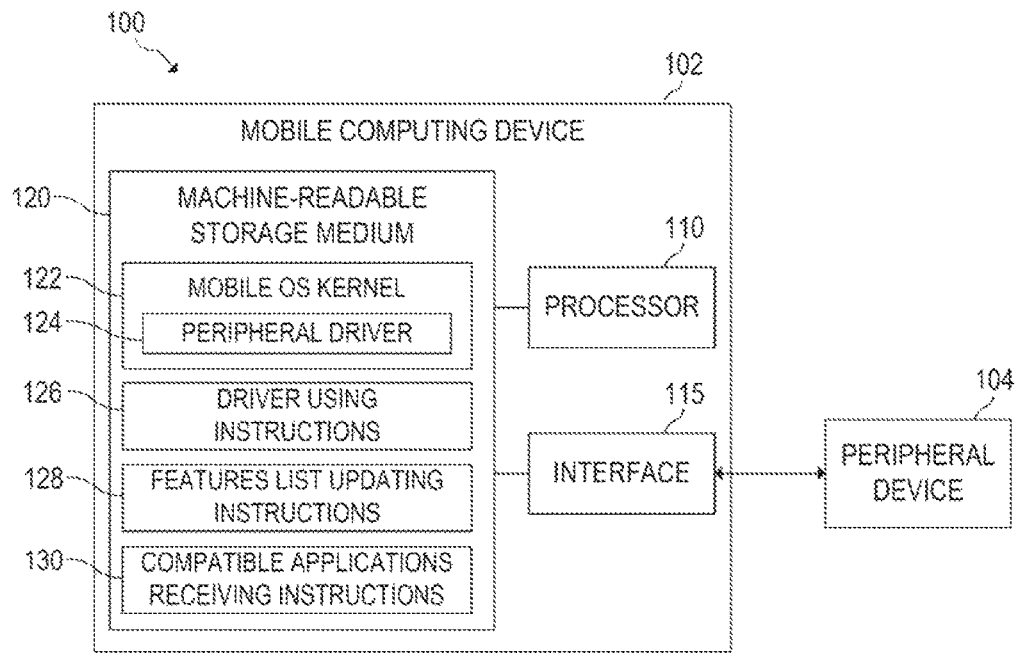
FIG. 1 is a block diagram of an example mobile computing device for providing mobile device support for sensors in peripherals.

Referring now to the drawings, FIG. 1 is a block diagram of an example system 100 for providing mobile device support for sensors in peripherals. The example system 100 may include a peripheral device 104 and a mobile computing device 102 such as a smartphone, a tablet, a notebook computer, a smartwatch, a heads-up display device, or any other electronic device suitable for providing mobile computing. In the embodiment of FIG. 1, mobile computing device 102 includes a processor 110, an interface 115, a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 126, 128, 130 to provide mobile device support for sensors in peripherals, as described below. As an alternative or in addition to retrieving and executing instructions, processor 110 may include one or more electronic circuits comprising a number of electronic components for performing the functionality of one or more of instructions 126, 128, 130.

Interface 115 may include a number of electronic components for communicating with peripheral device 104. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the peripheral device. Alternatively, interface 115 may be a wireless interface, such as a wireless local area network (WLAN) interface or a near-field communication (NFC) interface. In operation, as detailed below, interface 115 may be used to send and receive data to and from a corresponding interface of peripheral device 104.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for providing mobile device support for sensors in peripherals.

Mobile operating system (OS) kernel 122 acts as an intermediary between executing applications and processor 110 and other components of mobile computing device 102 such as memory (not shown). For example, mobile OS kernel 122 may include drivers for providing access to peripheral devices (e.g., peripheral device 104) and sensors. In this example, mobile OS kernel 122 converts requests from executing applications to device-specific or sensor-specific calls. In FIG. 1, mobile OS kernel 122 includes a peripheral driver 124 for communicating with peripheral device 104. The peripheral driver 124 may be configured to interact with a sensor (not shown) of peripheral device 104.

A mobile OS is an operating system that is configured to operate a portable computing device (e.g., mobile computing device 102). A mobile OS typically includes support for features found in portable computing devices such as touchscreens, cellular radios, near field communication (NFC), etc. The peripheral driver 124 is preloaded during the installation of the mobile OS on mobile computing device 102. Accordingly, operating system kernel 122 should be initially configured during the installation of the mobile OS to support various peripheral devices and sensors that may be attached to mobile computing device 102.

Peripheral device 104 is an accessory device that can be attached to and detached from mobile computing device 102 via interface 115. Examples of peripheral devices 104 include but are not limited to game controllers, GPS dongles, a USB scanner, etc. Peripheral device 104 may include one or more sensors that provide hardware features to mobile computing device 102.

Driver using instructions 126 uses driver 124 to determine that peripheral device 104 supports a sensor (e.g., microphone, image sensor, GPS sensor, accelerometer, etc). The driver 124 may be accessed via the mobile OS kernel 122 in response to the peripheral device 104 being attached to mobile computing device 102. For example, driver using instructions 126 may be executed by a service executing on mobile computing device 102 that monitors changes in peripheral devices.

Features list updating instructions 128 updates a list of supported hardware features based on the sensor of the peripheral device. For example, if the sensor is a GPS sensor, the list of supported hardware features (i.e., hardware profile) can be updated to indicate that mobile computing device 102 now supports GPS functionality. In some cases, peripheral device 104 can include multiple sensors, each of which may be added to the list of supported hardware features of mobile computing device 102.

Compatible applications receiving instructions 130 receives a list of compatible applications from an application store server. Specifically, the list of compatible applications may be received in response to sending the hardware profile of mobile computing device 102 to the application store server. The application store server provides access to applications for mobile computing devices (e.g., mobile computing device 102) according to their hardware profiles, in this example, application store server includes applications that are compatible with the sensor of peripheral device 104 in the list of compatible applications. At this stage, mobile computing device 102 may present the list of compatible applications for review by a user.

Figure 2:
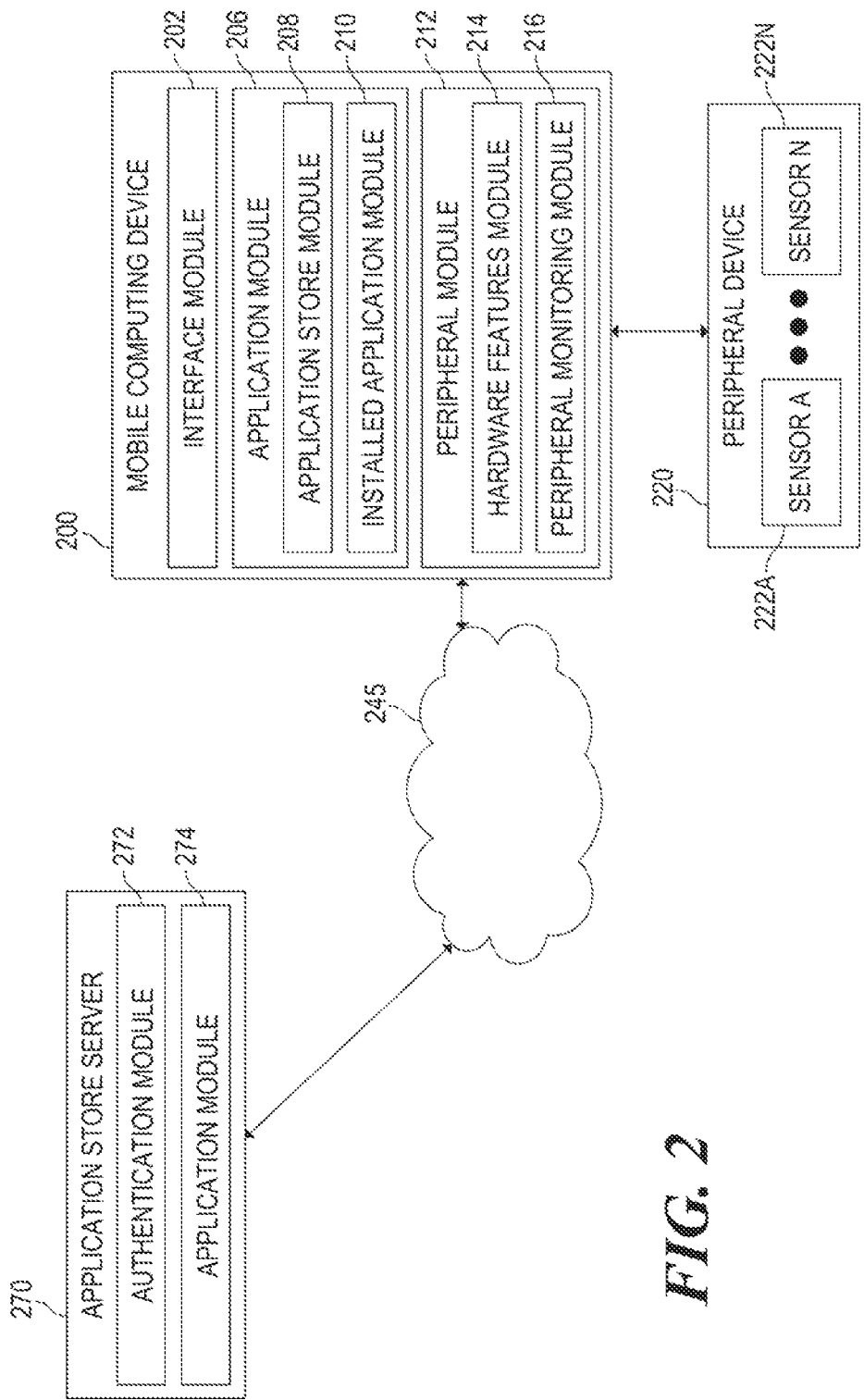
FIG. 2 is a block diagram of an example system for providing mobile device support for sensors in peripherals.

FIG. 2 is a block diagram of an example mobile computing device 200 in communication via a network 245 with application store server 270. As illustrated in FIG. 2 and described below, mobile computing device 200 may communicate with application store server 270 to provide mobile device support or sensors in peripherals.

As illustrated, mobile computing device 200 may include a number of modules 202-216. Each of the modules may include a series of instructions encoded on a machine-readable storage medium and executable by a processor of the mobile computing device 200. In addition or as an alternative, each module may include one or more hardware devices including: electronic circuitry for implementing the functionality described below.

As with mobile computing device 102 of FIG. 1, mobile computing device 200 may be a smartphone, a tablet, a notebook computer, a smartwatch, a heads-up display device, or any other device suitable for executing the functionality described below.

Interface module 202 may manage communications with peripheral device 220. Specifically, the interface module 202 may initiate connections with peripheral device 220 and then send or receive data to/from peripheral device 220, which is an accessory device that can be attached to and detached from mobile computing device 200.

Application module 206 may manage applications installed on mobile computing device 200. Although the components of application module 206 are described in detail below, additional details regarding an example implementation of module 206 are provided above in connection with instructions 130 of FIG. 1.

Application store module 208 may communicate with application store server 270 to discover compatible applications for mobile computing device 200. Specifically, application store module 208 may (1) provide a description of mobile computing device 200 (e.g., hardware profile, operating system version, etc.) and (2) receive a list of compatible applications from application store server 270 that are compatible with the description. In response to a user selecting one of the available applications, application store module 208 may obtain the selected application from application store server 270 and then install the application on mobile user device 200.

Installed application module 210 may manage access to installed applications on mobile computing device 200. Specifically, installed application module 210 may enable or disable applications in response to changes in the hardware profile of mobile computing device 200. For example, if a hardware feature is removed from the hardware profile, all applications that use the removed feature may be disabled. In another example, if a hardware feature is added to the hardware profile, all disabled applications that use the added feature may be enabled. In some cases, disabling an application results in the application being hidden from the user. In other cases, disabling an application results in a change to the icon (e.g., greying out the icon, marking the icon with an exclamation, etc.) that is associated the application.

Peripheral module 212 may interact with peripheral devices (e.g., peripheral device 220) attached to mobile computing device 200. Although the components of peripheral module 212 are described in detail below, additional details regarding an example implementation of module 212 are provided above in connection with instructions 126 and 128 of FIG. 1.

Hardware features module 214 manage a hardware profile for mobile computing device 200. The hardware profile is a list of hardware features (e.g., GPS, motion detection, image capture, etc.) that are supported by mobile computing device 200. The hardware features may be provided by internal sensors (not shown) of mobile computing device 200 and/or external sensors of peripheral devices (e.g., sensor A 222A and sensor N 222N of peripheral device 220). Hardware features module 214 may update the hardware profile based on notifications from peripheral monitoring module 216.

Peripheral monitoring module 216 monitors peripheral devices (e.g., peripheral device 220) that are attached to mobile computing device 200. For example, peripheral monitoring module 216 may execute as a service that monitors OS events for attaching and detaching peripheral devices. In this example, peripheral monitoring module 216 may detect when peripheral device 220 is attached and search for a driver that supports peripheral device 220 and its sensor(s) (e.g., sensor A 222A, sensor N 222N). If a driver is found, peripheral monitoring module 216 may send a request to hardware features module 214 to update the hardware profile accordingly. Conversely, peripheral monitoring module 216 may detect when peripheral device 220 is detached and then send a request to hardware features module 214 to remove the hardware features provided by peripheral device 220 from the hardware profile.

Peripheral device 220 is an accessory device that can be attached to and detached from mobile computing device 200 via an interface such as USB, Bluetooth, etc. Examples of peripheral devices 220 include but are not limited to game controllers. GPS dongles, a USB scanner, etc. Peripheral device 220 may include one or more sensors 222A, 222N (e.g. microphone, image sensor, GPS sensor, accelerometer, etc.) that provide hardware features to mobile computing device 200.

Application store server 270 may be any server accessible to mobile computing device 200 over the network 245 that is suitable for providing mobile applications. As shown, application store server 270 includes authentication module 272 and application module 274.

Authentication module 272 may interact with mobile computing device 200 to authenticate a user with the application store. Specifically, authentication module 272 may receive user credentials from mobile computing device 200 and determine whether the user is properly registered for accessing applications. If the user is properly registered, authentication module 272 may then allow mobile computing device 200 to communicate with the other modules of application store server 270.

Application module 274 provides the mobile computing device 200 with access to mobile applications. Initially, application module 274 may provide mobile computing device 200 with a list of compatible applications, which are determined based on a hardware profile provided by mobile computing device 200. Application module 274 may also provide installations for mobile applications that are requested by mobile computing device 200. For example, mobile computing device 200 may send a request for an application from the list of compatible applications, and application module 274 may respond by providing an installation file for the selected application.

Figure 3:
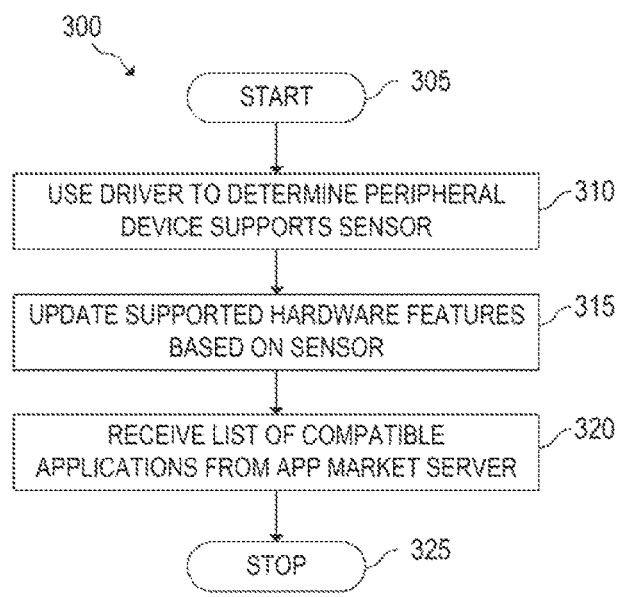
FIG. 3 is a flowchart of an example method for execution by a mobile computing device for providing mobile device support for sensors in peripherals.

FIG. 3 is a flowchart of an example method 300 for execution by mobile computing device 102 for providing mobile device support for sensors in peripherals. Although execution of method 300 is described below with reference to mobile computing device 102 of FIG. 1, other suitable devices for execution of method 300 may be used, such as mobile computing device 200 of FIG. 2. Method 300 may be implemented in the form of executable instructions stored on a machine-readable storage medium and/or in the form of electronic circuitry.

Method 300 may start in block 305 and continue to block 310, where mobile computing device 102 uses a driver to determine if a peripheral device supports a sensor. For example, the determination may be made in response to the peripheral device being attached to mobile computing device 102. In block 315, a at of supported hardware features (i.e., hardware profile) for mobile computing device 102 is updated based on the detected sensor.

In block 320, in response to sending the hardware profile to an application store server, mobile computing device 102 receives a list of compatible applications that is determined by the application store server using the hardware profile. The list of compatible applications includes applications that should only be installed if mobile computing device 102 includes hardware features provided by the sensor. Method 300 may subsequently proceed to block 325, where method 300 may stop.

Figure 4:
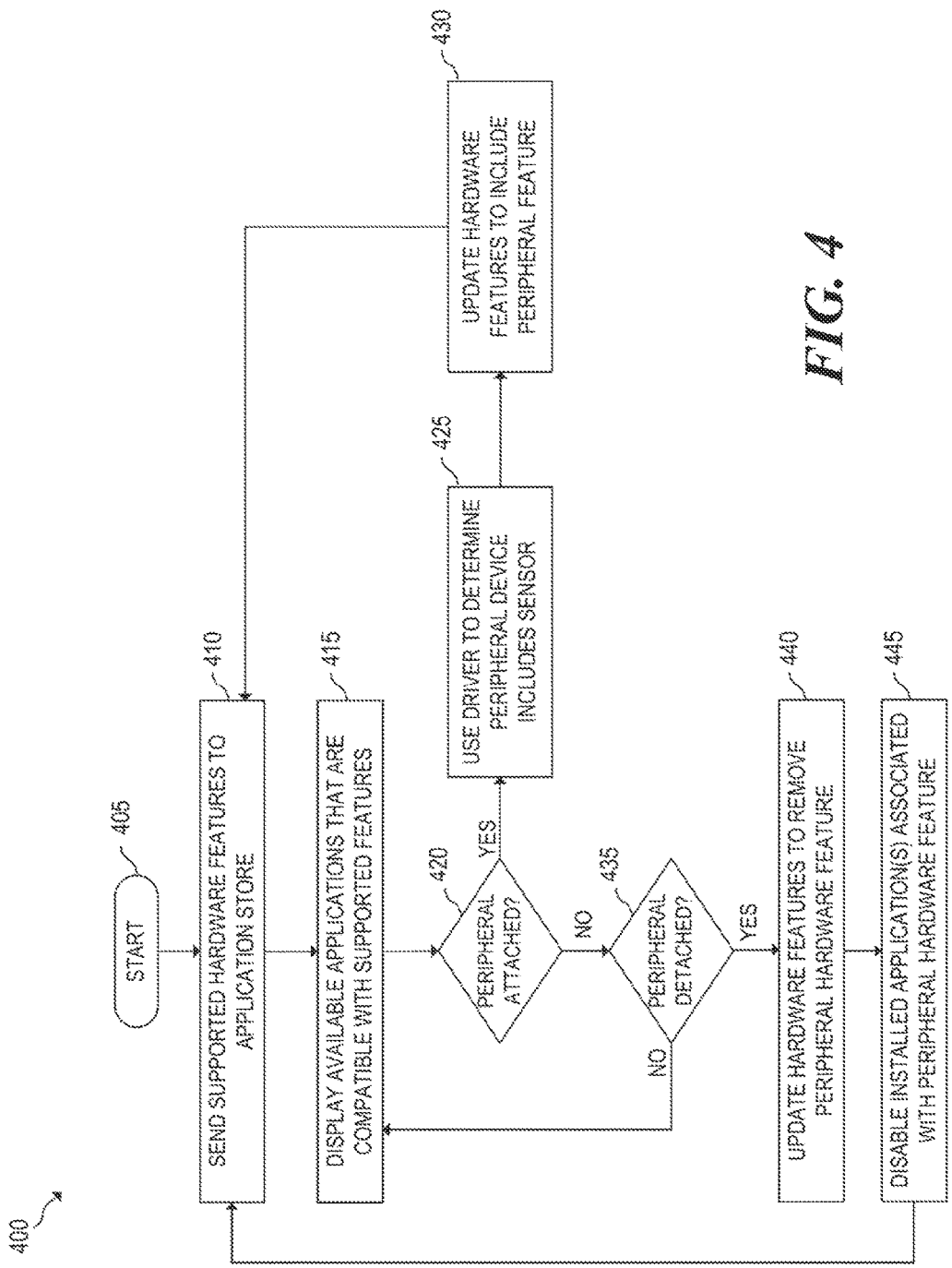
FIG. 4 is a flowchart of an example method for execution by an example mobile computing device for handling changes in peripherals attached to the mobile computing device.

FIG. 4 is a flowchart of an example method 400 for execution by a mobile computing device 200 for handling changes in peripherals attached to the mobile computing device 200. Although execution of method 400 is described below with reference to mobile computing device 200 of FIG. 2, other suitable devices for execution of method 400 may be used, such as mobile computing device 102 of FIG. 1. Method 400 may be implemented in the form of executable instructions stored on a machine-readable storage medium and/or in the form of electronic circuitry.

Method 400 may start in block 405 and continue to block 410, where mobile computing device 200 sends a list of supported hardware (i.e., hardware profile) features to an application store. The supported hardware features may initially be provided by internal sensors of mobile computing device 200 (e.g., built-in camera, built-in GPS sensor, etc.). In block 415, mobile computing device 200 displays a list of available applications that are compatible with the supported hardware features. The list of available applications is provided by the application store to mobile computing device 200 in response to the hardware profile. Mobile computing device 200 allows the user to select an application from the list of available applications for downloading and installing on mobile computing device 200.

In block 420, mobile computing device 200 determines if a peripheral device has been attached. If a peripheral device has been attached, mobile computing device 200 uses a driver to determine if the peripheral device includes a sensor in block 425. In block 430, the hardware profile for mobile computing device 200 is updated based on the sensor in the attached peripheral device. Specifically, a hardware feature associated with the sensor is added to the hardware profile. At this stage, method 400 returns to block 410, where the hardware profile is resubmitted to the application store. Then, in block 415 mobile computing device 200 can refresh the list of available applications to include mobile applications that use the hardware feature of the sensor.

Returning to block 420, if the peripheral device has not been attached, method 400 proceeds to block 435. In block 435, mobile computing device 200 determines if a peripheral device has been detached. If a peripheral device has not been detached, method 400 returns to block 415 to display the previous list of available applications. If a peripheral device has been detached, mobile computing device 200 updates the hardware profile to remove a hardware feature provided by the detached peripheral device in block 440. Next, in block 445, any applications that depend on the hardware feature of the detached peripheral device are disabled. For example, icons related to the applications that depend on the hardware feature of the detached peripheral device can be hidden from the user. The updated hardware profile may then be resubmitted to the application store in block 410.

The foregoing disclosure describes a number of example embodiments for extending hardware support for sensors embedded in peripherals. In this manner, the embodiments disclosed herein allow for the hardware feature of a peripheral device to be fully utilized by using preloaded drivers to identify a sensor in a peripheral device that is being attached to a mobile computing device. The mobile computing device can then update a list of supported hardware features to include a hardware feature of the sensor, where the list of supported hardware features is used to obtain compatible applications from an application store.

We claim:

1. A system comprising:
    a peripheral device that is removably attached to a mobile computing device, wherein the peripheral device comprises a sensor;
    an operating system of the mobile computing device comprising a kernel that is preloaded with a driver to enable use of the sensor in the peripheral device;
    a processor operatively connected to the peripheral device, the processor to:
        in response to the peripheral device being attached to the mobile computing device, use the driver to determine that the peripheral device includes the sensor;
        update a list of supported hardware features to include a peripheral hardware feature associated with the sensor based on the sensor of the peripheral device removably attached to the mobile computing device; and
        in response to providing the list of supported hardware features to an application store server, receive a list of available applications that are compatible with the list of supported hardware features.

2. The system of claim 1, wherein the processor is further to:
    enable an installed application that is compatible with the peripheral hardware feature.

3. The system of claim 1, wherein the processor is further to:
    in response to the peripheral device being detached from the mobile computing device, remove the peripheral hardware feature from the list of supported hardware features to obtain an updated list of supported hardware; and
    disable an installed application that is compatible with the peripheral hardware feature.

4. The system of claim 3, wherein the processor is further to:
    display an icon associated with the installed application in a disabled state.

5. The system of claim 3, wherein the processor is further to:
    in response to selection of the icon, provide a notification that the peripheral device should be attached to enable the installed application.

6. The system of claim 3, wherein the processor is further to:
    in response to sending the updated list of supported hardware features to the application store server, receive a second list of available applications that are compatible with the updated list of supported hardware features, wherein the second list of available applications does not include the installed application.

7. A method comprising:
    in response to a peripheral device being attached to a mobile computing device, using a driver to determine that the peripheral device includes a sensor, wherein the driver is preloaded in an operating system kernel of the mobile computing device;
    updating a list of supported hardware features to include a peripheral hardware feature based on hardware features provided by the sensor of the peripheral device attached to the mobile computing device;
    providing the list of supported hardware features to an application store server; and
    receiving a list of available applications that are compatible with the list of supported hardware features from the application store server.

8. The method of claim 7, further comprising:
    enabling an installed application that is compatible with the peripheral hardware feature.

9. The method of claim 7, further comprising:
    in response to the peripheral device being detached from the mobile computing device, removing the peripheral hardware feature from the list of supported hardware features to obtain an updated list of supported hardware; and
    disabling an installed application that is compatible with the peripheral hardware feature.

10. The method of claim 9, further comprising:
    displaying an icon associated with the installed application in a disabled state.

11. The method of claim 9, further comprising:
    in response to selection of the icon, providing a notification that the peripheral device should be attached to enable the installed application.

12. A non-transitory machine-readable storage medium encoded with instructions executable by a processor, the machine-readable storage medium comprising instructions to:
    in response to a peripheral device being attached to a mobile computing device, use a driver to determine that the peripheral device includes a sensor, wherein the driver is preloaded in an operating system kernel of the mobile computing device;
    update a list of supported hardware features to include a peripheral hardware feature based on hardware features provided by the sensor of the peripheral device being attached to the mobile computing device;
    obtain a list of available applications that are compatible with the list of supported hardware features from an application store server; and
    enable an installed application that is compatible with the peripheral hardware feature.

13. The non-transitory machine-readable storage medium of claim 12, wherein the machine-readable storage medium further comprises instructions to:
    in response to the peripheral device being detached from the mobile computing device, remove the peripheral hardware feature from the list of supported hardware features to obtain an updated list of supported hardware; and
    disable an installed application that is compatible with the peripheral hardware feature.

14. The non-transitory machine-readable storage medium of claim 13, wherein the machine-readable storage medium further comprises instructions to:
    display an icon associated with the installed application in a disabled state.

15. The non-transitory machine-readable storage medium of claim 13, wherein the machine-readable storage medium further comprises instructions to:
    in response to selection of the icon, provide a notification that the peripheral device should be attached to enable the installed application.

* * * * *